United States Patent [19]
Ohta

[11] Patent Number: 5,926,559
[45] Date of Patent: Jul. 20, 1999

[54] COLOR-IMAGE PROCESSING APPARATUS AND COLOR-IMAGE PROCESSING METHOD

[75] Inventor: Kenichi Ohta, Kawasaki, Japan

[73] Assignee: Canon Kabushiki Kaisha, Tokyo, Japan

[21] Appl. No.: 08/844,601

[22] Filed: Apr. 21, 1997

[30] Foreign Application Priority Data

Apr. 24, 1996 [JP] Japan ..................................... 8-102567

[51] Int. Cl.$^6$ ...................................................... G06K 9/00
[52] U.S. Cl. ........................................... 382/162; 358/523
[58] Field of Search ........................... 382/162; 358/518, 358/522, 523, 525, 506, 501, 520, 524

[56] References Cited

U.S. PATENT DOCUMENTS 5,594,558   1/1997   Usami et al. ............................ 358/518
5,768,410   6/1998   Ohta et al. ............................... 382/162

FOREIGN PATENT DOCUMENTS 7193723   7/1985   Japan .

*Primary Examiner*—Joseph Mancuso
*Assistant Examiner*—Vikkram Bali
*Attorney, Agent, or Firm*—Fitzpatrick, Cella, Harper & Scinto

[57] ABSTRACT

A select-signal generator generates a select signal according to a magnitude comparison between the low-order bit data $R_l$, $G_l$, and $B_l$ of input R, G, and B color signals. A table memory generates three addresses with the use of the high-order bit data $R_u$, $G_u$, and $B_u$ according to the select signal and outputs lattice point data C11, C12, and C13 corresponding to the three addresses. Another table memory outputs one lattice data C2 for a lattice point which is offset from lattice points in the above-described table memory by addressing with the use of the high-order bit data. Then, an interpolation circuit executes interpolation according to the data C11, C12, C13, and C2 at four lattice points which form a triangular pyramid as a minimum interpolation space.

7 Claims, 7 Drawing Sheets

COLOR-IMAGE PROCESSING APPARATUS AND COLOR-IMAGE PROCESSING METHOD

BACKGROUND OF THE INVENTION

1. Field of the Invention

The present invention relates to color-image processing apparatuses and color-image processing methods.

2. Description of the Related Art

Figure 1:
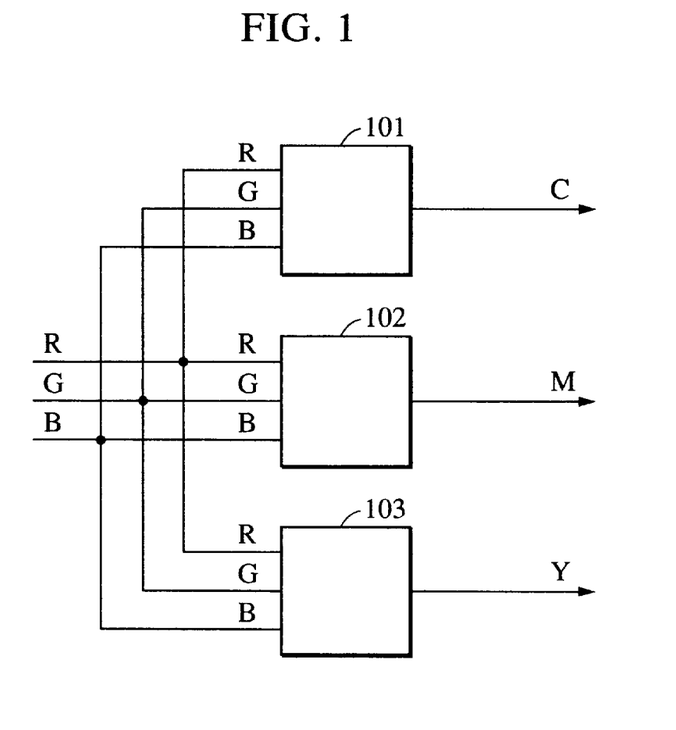
FIG. 1 is a block diagram showing a configuration of a main section of a conventional color conversion unit.

There has been known a color-image processing apparatus including a conventional color conversion unit shown in FIG. 1. Three color signals, red (R), green (G), and blue (B) signals, obtained by color-separating an original image are converted to three primary color signals, cyan (C), magenta (M), and yellow (Y) signals, which are used in subtractive mixture of color stimuli, by the color conversion unit shown in FIG. 1. Based on these signals, a color image is printed out by a printing device such as an ink-jet printer.

Signal processing circuits 101, 102, and 103 shown in FIG. 1 generate output C, M, and Y color signals according to three input primary R, G, and B color signals. The signal processing circuits 101, 102, and 103 execute, for example, calculations including a so-called masking operation expressed by the following equations.

Circuit 101: $C=A_{11} \times R + A_{12} \times G + A_{13} \times B$

Circuit 102: $M=A_{21} \times R + A_{22} \times G + A_{23} \times B$

Circuit 103: $Y=A_{31} \times R + A_{32} \times G + A_{33} \times B$ where, $A_{ij}$ (i, j=1, 2, 3) indicate coefficients determined according to the characteristics of an output device such as a printer.

Unlike this color conversion unit, in which the signal processing circuits 101, 102, and 103 shown in FIG. 1 execute the above-described sum-of-products operation, another color conversion unit has been proposed in which the results of the operation are stored in a table memory in advance and the corresponding results of the operation are read and output according to input R, G, and B signals. In this case, however, when an input signal has eight bits per color, a memory area corresponding to $(2^8)^3$ addresses (namely more than 16 million addresses) is required. This is not practical in terms of memory size.

Figure 2:
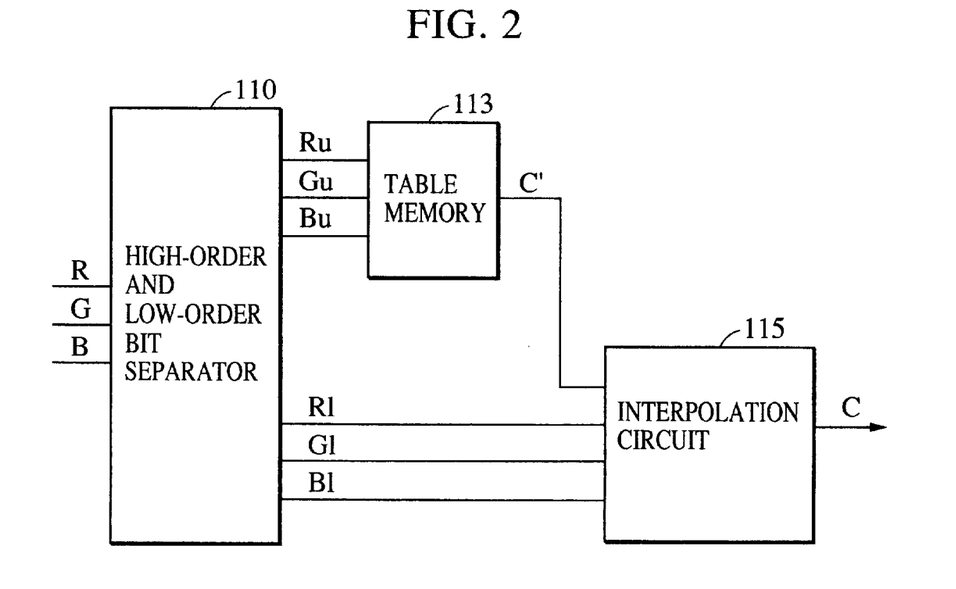
FIG. 2 is a block diagram showing a configuration of a main section of another conventional color conversion unit.

In contrast, there is also known a color-image processing apparatus including a conventional color conversion unit shown in FIG. 2. Input R, G, and B signals are separated into high-order bit data ($R_u$, $G_u$, and $B_u$) and low-order bit data ($R_l$, $G_l$, and $B_l$) by a high-order and low-order bit separator 110. A table memory 113 stores the results of an operation only for the high-order bit data ($R_u$, $G_u$, and $B_u$). An interpolation circuit 115 applies an interpolation to a C' signal output from the table memory 113 corresponding to the high-order bit data, with the use of the low-order bit data ($R_1$, $G_1$, and $B_1$), and the final output signal C is obtained.

With this configuration, the memory area in the table memory is just required to have the number of addresses corresponding to the number of the high-order bits of the R, G, and B input signals. When each color signal has three high-order bits, for example, a memory area needs to have $(2^3)^3$ addresses (namely, 512 addresses). A memory area required for the table is substantially reduced.

To perform an interpolation, the C' signal output from the table memory 113 actually includes not only a signal corresponding to an address indicated by the high-order bit data ($R_u$, $G_u$, and $B_u$) but also signals corresponding to seven proximal addresses indicated by combinations of the high-order bit $R_u$, $G_u$, and $B_u$ signals and, for example, each signal plus 1. The circuit shown in FIG. 2 is used for generating the C signal among the color signals, C, M, and Y. Circuits for generating the M and Y signals are configured in the same way.

Among the above-described conventional apparatuses, the apparatus using the table memory and the interpolation circuit has an advantage in easily implementing complicated non-linear conversion with a relatively small memory capacity. Since the table memory gives actual conversion data only for the specified input signals, however, conversion data for input signals other than the specified input signals is calculated by linear interpolation, thus adding interpolation errors.

To reduce the interpolation errors, it is most effective to increase the number of defining bits plus the high-order bits of input signals used for generating the address of the table memory. When the number of bits is increased by one bit, the number of addresses is also increased accordingly. With R, G, and B inputs, the memory area in the table memory needs to be extended by $2^3$ times, namely 8 times.

Therefore, conversion precision and the amount of memory area in the table memory are trade-offs. To reduce the amount of memory, the number of bits needs to be set with conversion precision being reduced to some extent.

As described above, data to be read from the table memory with an input of the high-order bits of input signals is not just one. It is necessary to read the data at the address indicated by the high-order bits and the data at the proximal addresses at the same time.

Figure 3:
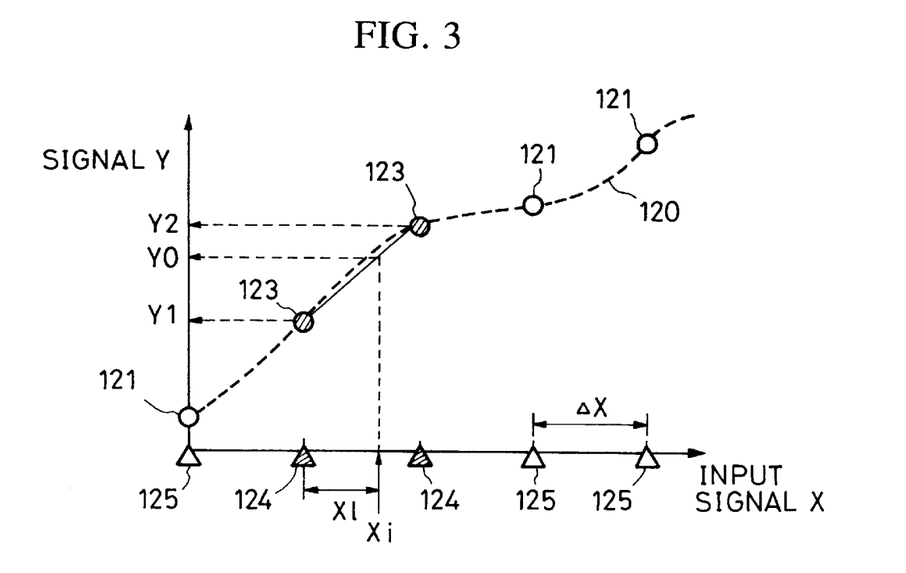
FIG. 3 is a graph showing an interpolation operation in the conventional color conversion unit shown in FIG. 2.

FIG. 3 is a graph showing the method for reading the table memory and for interpolating the data thereof, using a one-dimensional input for simplicity.

A dotted line 120 indicates a Y signal obtained by converting an input X signal. Values 124 and 125 indicated by triangles on the X-axis representing the input X signal have low-order bits equalling zero and are expressed only by the high-order bits. These points are hereinafter called lattice points. The table memory stores the Y values corresponding to these lattice points. In other words, the table memory stores data corresponding to circles 121 and 123.

When signal $X_i$ is input, the high-order and low-order bit separator separates it into a high-order bit signal and a low-order bit signal. The high-order bit signal generates two lattice points 124 and 125 in the table memory, and output signals Y1 and Y2 are read which are indicated by two hatched circles 123. The interpolation circuit executes an interpolation operation according to the following equation with use of the two-point data and the low-order bit signal X1 of the input signal $X_i$, and outputs signal Y0.

$$Y0=Y1+(Y2-Y1)\times X1/\Delta X \quad (1)$$

The above description is applied to a one-dimensional input. When an input signal has three-dimensional data including R, G, and B signals, $2^3=8$ proximal data items are required. To read these data items at the same time, a relatively large load is taken in a memory-read circuit.

SUMMARY OF THE INVENTION

The present invention is made in order to solve the foregoing problems. Accordingly, it is an object of the present invention to provide a color-image processing apparatus and a color-image processing method both of which obtain sufficient conversion precision in a color conversion using a table memory with the amount of the table memory being suppressed to a relatively low level and which reduce load in memory read operations.

The foregoing objects are achieved according to one aspect of the present invention through the provision of a color-image processing apparatus for receiving n (n: natural number) types of color signals and outputting other color signals based on the n types of color signals, including: separating means for separating each of the n types of input color signals into high-order bit data and low-order bit data; first memory means for storing output values corresponding to all combinations of the high-order bit data in each of the n types of color signals; second memory means for storing output values corresponding to all data obtained by adding the specified offset to the high-order bit data in each of the n types of color signals; first reading means for generating three addresses according to the high-order and low-order bit data separated by the separating means and for reading from the first memory means the three output values corresponding to the three addresses; second reading means for generating one address according to the high-order bit data used by the first reading means and for reading one output value corresponding to the one address from the second memory means; and operation means for executing interpolation according to the four output values read by the first and second reading means and the low-order bit data corresponding to the high-order bit data used by the first and second reading means and for outputting other color signals.

The foregoing objects are also achieved according to another aspect of the present invention through the provision of a color-image processing method for receiving n (n: natural number) types of color signals and outputting other color signals based on the n types of color signals, including: a separating step for separating each of the n types of input color signals into high-order bit and low-order bit data; a first reading step for generating three addresses according to the high-order and low-order bit data separated in the separating step and for reading from a first memory the three output values corresponding to the three addresses; a second reading step for generating one address according to the high-order bit data used in the first reading step and for reading from a second memory one output value corresponding to the one address; and an operation step for executing interpolation according to the four output values read in the first and second reading steps and the low-order bit data corresponding to the high-order bit data used in the first and second reading steps and for outputting other color signals, wherein the first memory stores output values corresponding to all combinations of the high-order bit data in each of the n types of color signals, and the second memory stores output values corresponding to all data obtained by adding the specified offset to the high-order bit data in each of the n types of color signals.

Other objects and other features of the present invention will be made clear by the following description of an embodiment.

DESCRIPTION OF THE PREFERRED EMBODIMENT

An embodiment of the present invention will be described below in detail by referring to the drawings.

Figure 4:
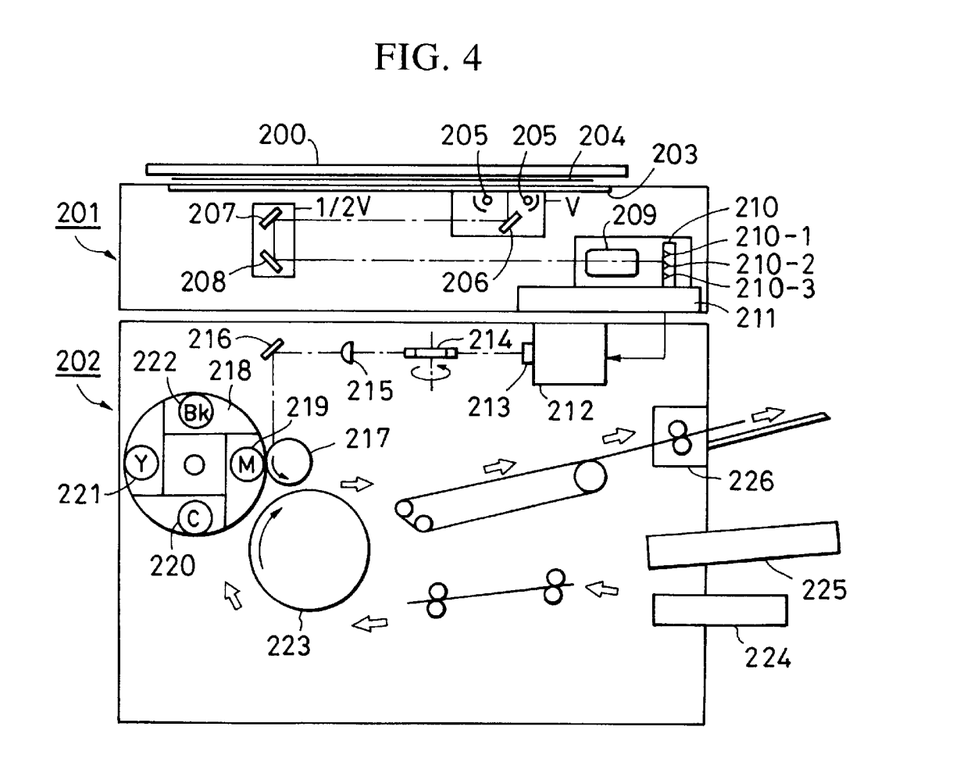
FIG. 4 is a typical view of an internal structure of a copying machine according to an embodiment of the present invention.

FIG. 4 is a typical cross section of a copying machine which uses a color-image processing apparatus according to an embodiment of the present invention.

In FIG. 4, an image scanner 201 reads an original and executes image processing such as color conversion. A printer 202 outputs in full color an image corresponding to the original image read by the image scanner 201.

In the image scanner 201, the original 204 is disposed on an original table glass (hereinafter called a platen) 203 with pressure being applied by a mirror-surface press plate 200.

The original 204 is illuminated by a lamp 205. Light reflected from the original 204 forms an image on a three-line solid imaging device (hereinafter called a CCD) 210 through mirrors 206, 207, and 208, and a lens 209. With this configuration, three image signals for full-color information, red (R), green (G), and blue (B) signals, are sent to a signal processor 211.

The lamp 205 and the mirror 206 move at a specified speed v, and the mirrors 207 and 208 move at half the specified speed mechanically in the direction perpendicular to the electrical scanning (main scanning) direction in the CCD 210, which is a line sensor. Thus, the entire area of the original is scanned (sub scanned). The original 204 is read at a resolution of 400 dpi in the main and sub scans.

Figure 5:
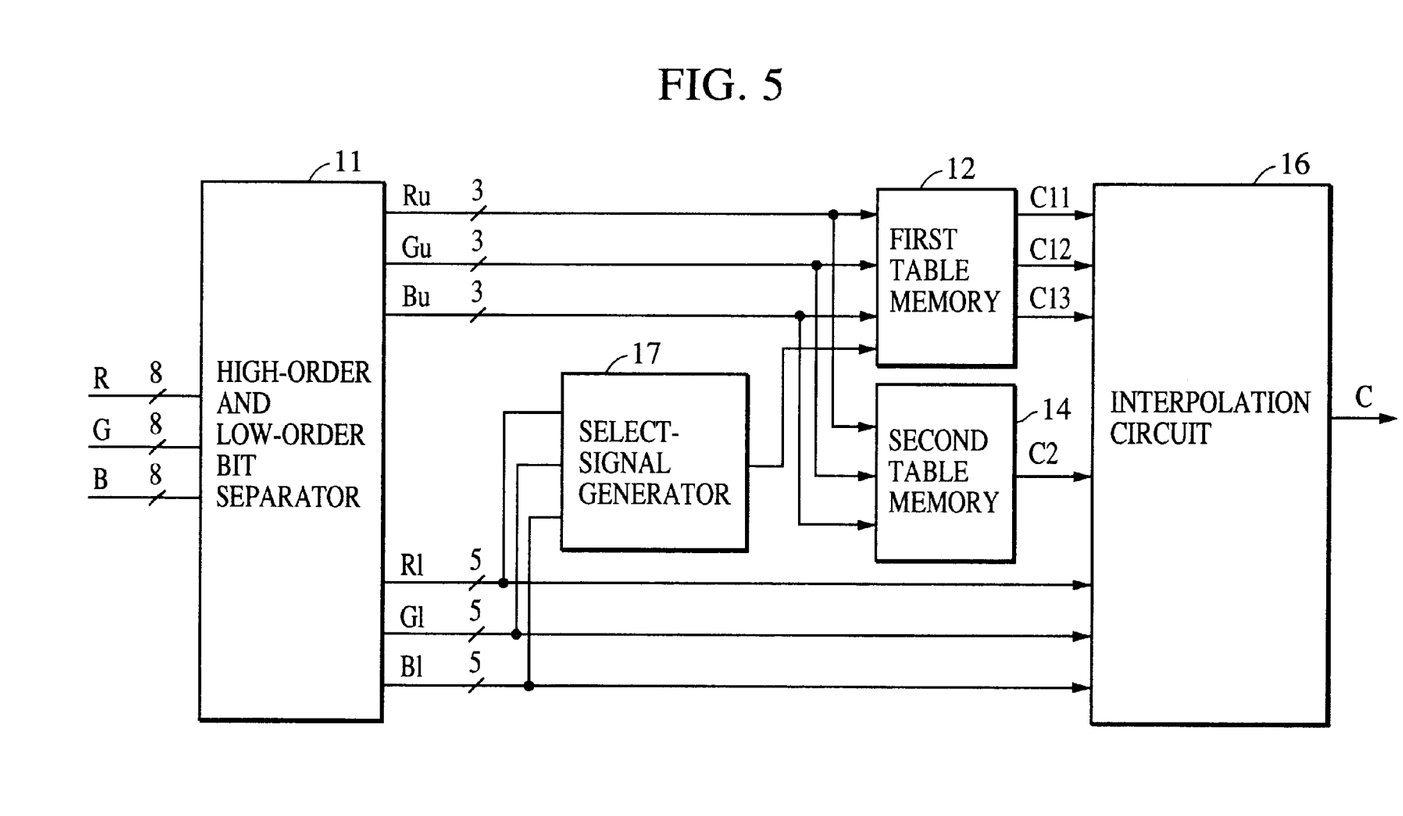
FIG. 5 is a block diagram showing a configuration of a color-conversion unit according to an embodiment of the present invention.

The signal processor 211 includes a color conversion unit shown in FIG. 5. With this unit, the above-described processing is applied to image signals (R, G, and B) obtained in the reading operation to generate magenta (M), cyan (C), yellow (Y), and black (Bk) signals and send them to the printer 202. In one scanning of an original by the image scanner 201, one signal among the M, C, Y, and Bk signals is sent to the printer 202. One printing operation of one original finishes with a total of four scanning operations. The configuration shown in FIG. 5 is provided for each of C, M, and Y signals. Instead, the color conversion unit may be formed such that the contents of the table memory are sequentially changed to match M, C, and Y signals in three scanning operations. The Bk color signal can be obtained by under-color removal according to the M, C, and Y signals obtained as described above and black form generation.

The image scanner 201 sends M, C, Y, and Bk image signals to a laser driver 212. The laser driver 212 modulates and drives a semiconductor laser 213 according to the sent image signals. A photosensitive drum 217 is scanned with laser light transmitted through a polygon mirror 214, f-θ lens 215, and a mirror 216. The signals are written at a resolution of 400 dpi in the main and sub scanning in the same way as in reading.

A rotating developing unit 218 includes a magenta developing unit 219, a cyan developing unit 220, a yellow developing unit 221, and a black developing unit 222. These four developing units alternately contact the photosensitive drum 217, and an electrostatic image formed on the photosensitive drum is developed with toner. A sheet fed from a sheet cassette 224 or 225 is wound onto a transfer drum 223, and the image developed on the photosensitive drum is transferred to the sheet. After M, C, Y, and Bk colors are sequentially transferred, the sheet passes through a fixing unit 226. Toner is fixed onto the sheet and the sheet is discharged.

FIG. 5 is a block diagram showing a configuration of a color conversion unit according to an embodiment of the present invention. In FIG. 5, three input signals, R, G, and B signals, are converted to form output signal C. The color conversion unit is controlled by a CPU (not shown) according to the program specified beforehand.

A high-order and low-order bit separator 11 separates each of the R, G, and B signals into a high-order bit signal and a low-order bit signal. In FIG. 5, three high-order bits are output as $R_u$, $G_u$, and $B_u$ signals and five low-order bits are output as $R_l$, $G_l$, and $B_l$ signals. The $R_u$, $G_u$, and $B_u$ high-order bit signals are input to a first table memory 12 as address signals, and output signals C11, C12, and C13 indicating multiple conversion values stored in the table memory 12 are read. The $R_u$, $G_u$, and $B_u$ high-order bit signals are also input at the same time to a second table memory 14 as address signals, and output signal C2 indicating a second conversion value is read. The $R_l$, $G_l$, and $B_l$ low-order bit signals are input to an interpolation circuit 16 and to a select-signal generator 17. The select-signal generator 17 compares the $R_l$, $G_l$, and $B_l$ low-order bit signals in magnitude as will be described later and sends a select signal obtained from the result to the table memory 12. In other words, the C11, C12, and C13 signals are output from the first table memory in response to the addresses determined according to the $R_u$, $G_u$, and $B_u$ high-order bit signals and the select signal sent from the select-signal generator 17. The interpolation circuit 16 executes a linear interpolation operation described later according to the first output signals C11, C12, and C13, the second output signal C2, and the low-order bit data $R_l$, $G_l$, and $B_l$, and outputs the final output signal C.

This final output signal is used in a printer of the copying machine as cyan (C) data as will be described later. Magenta (M) and yellow (Y) data can also be obtained by providing the above-described configuration for magenta and yellow, or by changing the contents of the table memory and sequentially outputting the data for each color.

The first table memory 12 and the second table memory 14 will be described below.

Let the relationship between the R, G, and B input signals and the final output signal C be defined as follows as a function F.

$$C = F(R, G, B) \quad (2)$$

Let the R, G, and B input signals be separated into high-order bit data $R_u$, $G_u$, and $B_u$, and low-order bit data $R_l$, $G_l$, and $B_l$ as shown in equation (3). In equation (3), $N_i$ indicates the number of bits in an input signal, $N_u$ indicates the number of high-order bits, and $N_l$ indicates the number of low-order bits. It is clear that $N_i = N_u + N_l$ (in FIG. 5, $N_u = 3$ and $N_l = 5$).

$$R = R_u \times 2^{Nl} + R_l$$

$$G = G_u \times 2^{Nl} + G_l$$

$$B = B_u \times 2^{Nl} + B_l \quad (3)$$

Equation (3) can also be expressed in the following way.

$$R_u = [R/2^{Nl}], \quad R_l = R - R_u \times 2^{Nl}$$

$$G_u = [G/2^{Nl}], \quad G_l = G - G_u \times 2^{Nl}$$

$$B_u = [B/2^{Nl}], \quad B_l = B - B_u \times 2^{Nl}$$

where [a/b] indicates the quotient of a/b.

Figure 6:
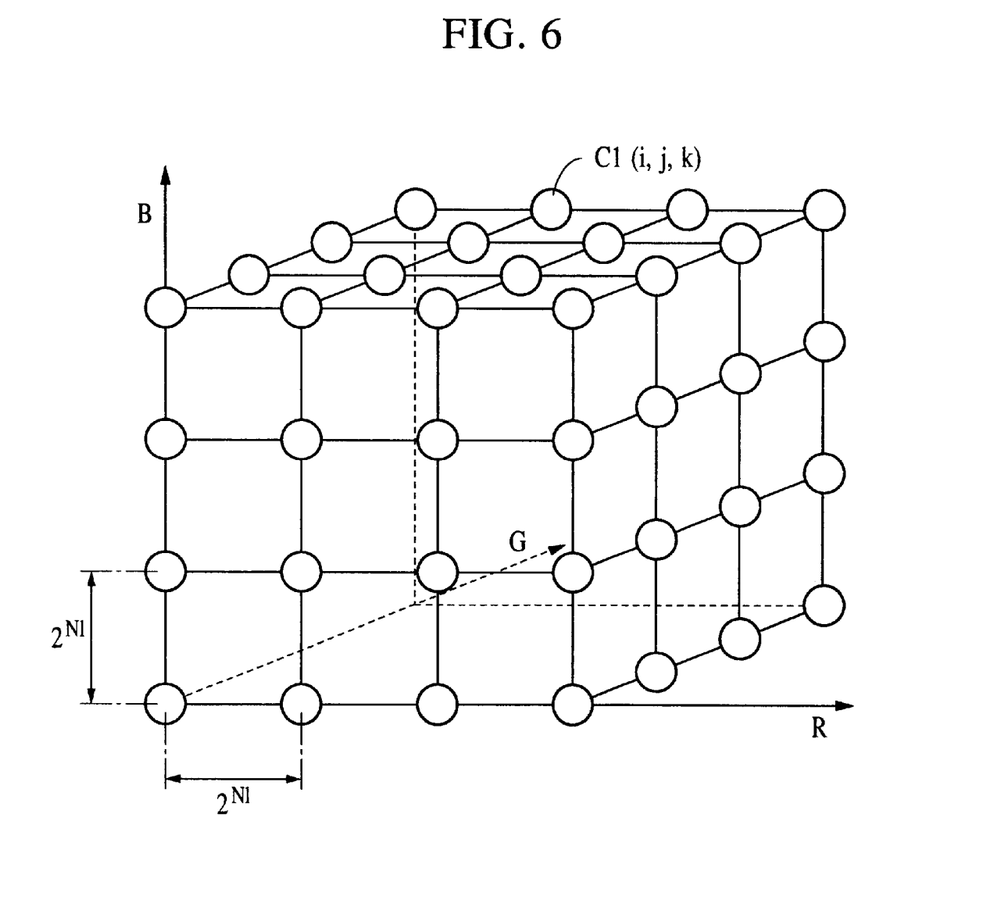
FIG. 6 is a view for explaining the contents of a first table memory in the color conversion unit according the foregoing embodiment.

The first table memory 12 stores output values corresponding to all combinations of high-order bit data ($R_u$, $G_u$, and $B_u$) in the R, G, and B signals, namely, the values of function (2) corresponding to all combinations of R, G, and B input signals which have low-order bit data of zero. Let the values be defined as $C_1(i, j, k)$. It can be expressed as follows.

$$C_1(i, j, k) = F(i \times 2^{Nl}, j \times 2^{Nl}, k \times 2^{Nl}) \quad (4)$$

where i, j, and k are integer ranging from 0 to $2^{Nu}$.

In the first table memory 12, it is clear from equation (4) that a memory area having $(2^{Nu}+1)^3$ addresses (729 addresses when $N_u$ is 3) is required.

Data $C_1(i, j, k)$ expressed by equation (4) corresponds to signal values which are written on lattice points arranged at an equal interval of $2^{Nl}$ as shown in FIG. 6 when viewed in a three-dimensional space made by the R, G, and B input signals.

Figure 7:
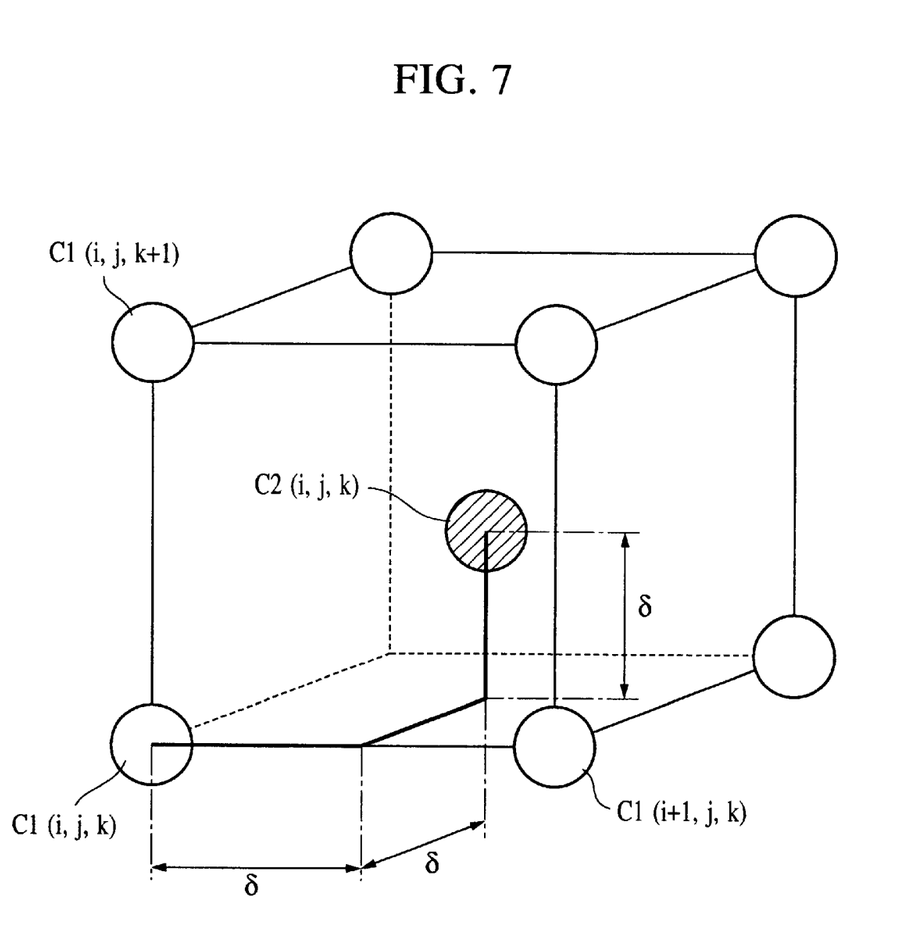
FIG. 7 is a view for explaining the contents of a second table memory.

In contrast, the second table memory 14 stores data C2 at a point which is disposed between the above-described lattice points as shown in FIG. 7. In other words, function value C2 expressed by the following equation is stored with an offset of δ.

$$C_2(i, j, k) = F(i \times 2^{Nl} + \delta, j \times 2^{Nl} + \delta, k \times 2^{Nl} + \delta) \quad (5)$$

where i, j, and k are integers ranging from 0 to $2^{Nu}-1$.

Offset δ needs to be set such that function value C2 corresponds to a point disposed within the lattice points specified by function values C1. Hence, the following condition needs to be satisfied.

$$0 < \delta < 2^{Nl} \quad (6)$$

To simplify the selection of lattice points described below, the following equation is set.

$$\delta = 2^{Nl}/2 \quad (7)$$

In the second table memory 14, a memory area having $(2^{Nu})^3$ addresses (512 addresses when $N_u$ is 3) is required as clearly shown in equation (5).

The final output signal C is obtained according to the output signals of the two sets of table memory configured as described above. An interpolation method used in the interpolation circuit 16 will be described below by referring to FIG. 8 and others.

Figure 8:
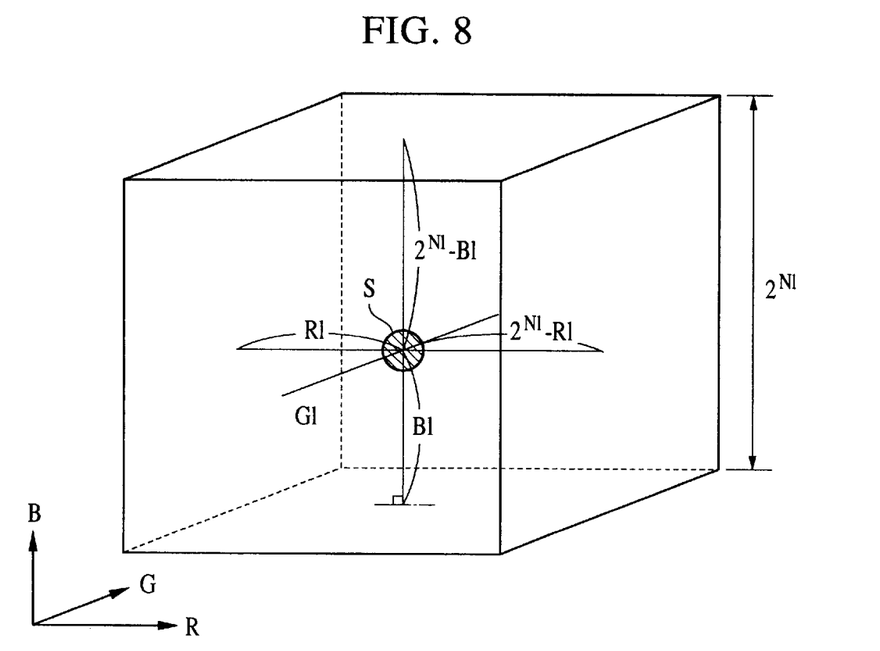
FIG. 8 is a view showing the positional relationship of an input signal in an input space in the color conversion unit according to the foregoing embodiment.

The R, G, and B input signals are separated into high-order bit data and low-order bit data as shown in equation (3). The data C11 to C14 of the four lattice points closest to the point specified by the R, G, and B input signals is read from the first table memory 12. In other words, the data of four lattice points constituting the surface which is closest to point S (a hatched circle) specified by the input signals among six cubic surfaces enclosing point S is read.

As shown in FIG. 8, the distance between the input point S and each surface is expressed by the low-order bit signals $R_l$, $G_l$, and $B_l$. For example, the distance between the input point S and the lower surface (formed by C11, C12, C13, and C14) of the cube equals $B_l$.

The distances between the input point S and the surfaces are:

Distance to the left-hand surface=R

Distance to the right-hand surface=$2^{Nl}-R_l$

Distance to the proximal surface=$G_l$

Distance to the distal surface=$2^{Nl}-R_l$

Distance to the lower surface=$B_l$

Distance to the upper surface=$2^{Nl}-B_l$

Therefore, a surface which gives the minimum value among the above six values is determined to be closest to the point S.

Figure 9:
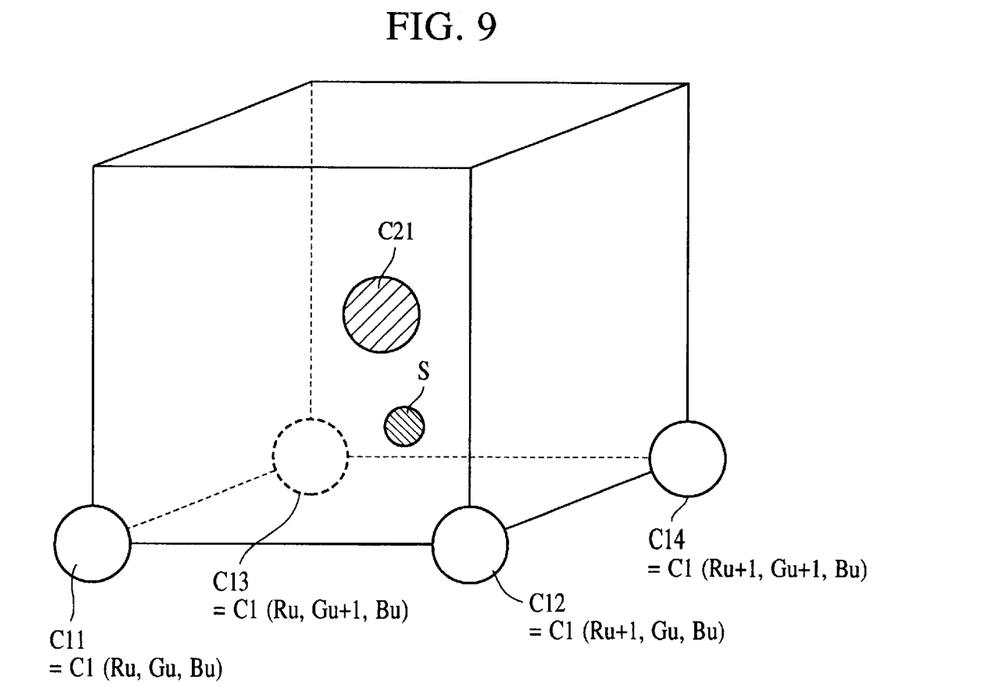
FIG. 9 is a view showing the positional relationship of input signals to the first and second table memory in the color conversion unit according to the foregoing embodiment.

FIG. 9 illustrates a method for selecting a lattice point when $B_l$ is the minimum value. As shown by circles in the figure, data C11, C12, C13, and C14 is written at the four lattice points of the surface closest to the R, G, and B input signals.

In FIG. 9, data C11, C12, C13, and C14 can be expressed as follows by applying the high-order bit data of the R, G, and B input signals to equation (4).

$C11=C_1(R_u, G_u, B_u)$ $C12=C_1(R_u+1, G_u, B_u)$ $C13=C_1(R_u, G_u+1, B_u)$ $C14=C_1(R_u+1, G_u+1, B_u)$ (8)

Since all data items C11–C14 cannot be read at the same time, they may be read sequentially. Alternatively, four sets of the same table memory are prepared and the data items are read in parallel.

On the other hand, from the second table memory 14, data C21 of the lattice point closest to the R, G, and B input signals is read. The point is shown in FIG. 9 by a hatched circle. It can be expressed as follows by applying equation (5).

$C21=C_2(R_u, G_u, B_u)$ (9)

With the foregoing procedure, the data of a total of five lattice points is obtained. Since δ is specified as shown in equation (7), point S specified by the R, G, and B input signals is disposed within the quadrangular pyramid made by the five points as shown in FIG. 10A.

Figure 10A:
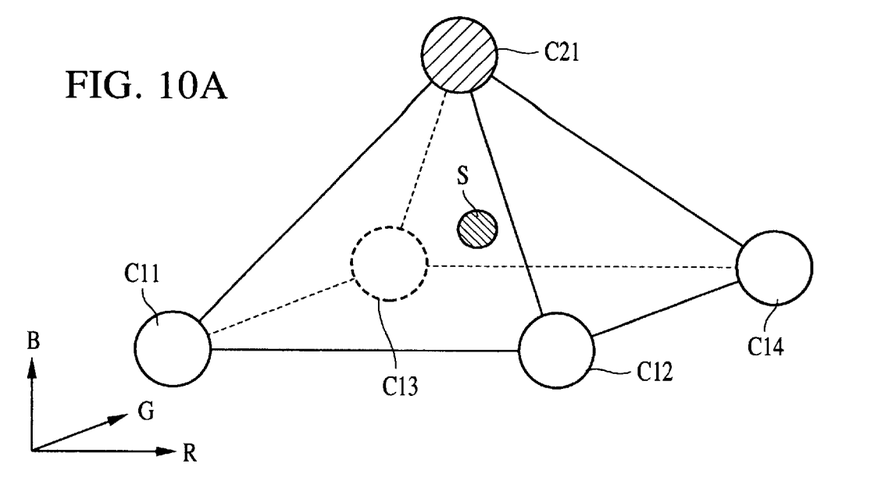
FIGS. 10A, 10B, and 10C are views showing lattice-point spaces used for interpolation in the foregoing embodiment.
Figure 10B:
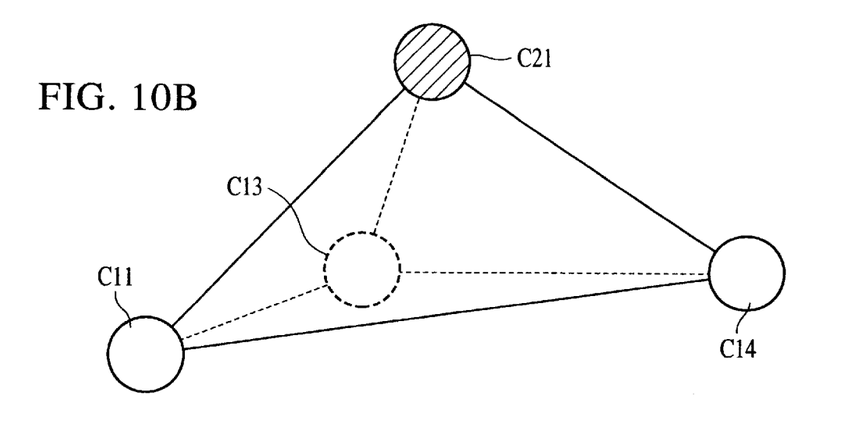
Figure 10C:
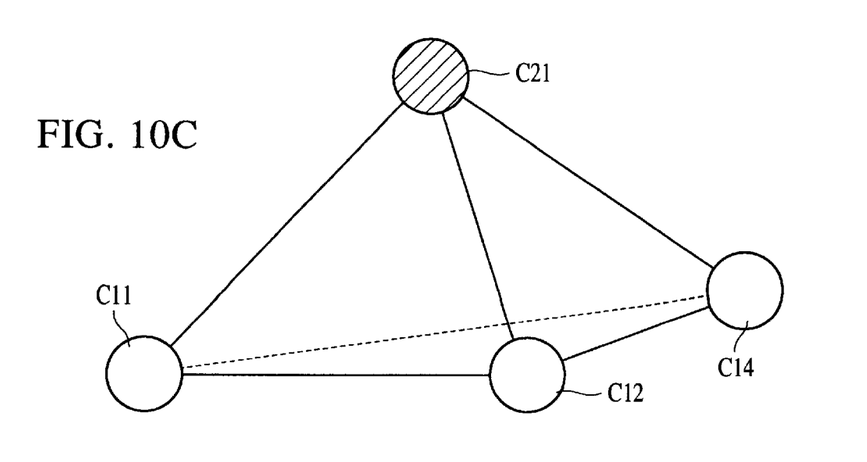

The quadrangular pyramid shown in FIG. 10A can be divided into two triangular pyramids shown in FIGS. 10B and 10C. The input end S exists either in the triangular pyramid shown in FIG. 10B or in the triangular pyramid shown in FIG. 10C. Whether the point S exists in either pyramid can be determined by comparing magnitudes of low-order bit signals. When $R_l$ is larger than $G_l$, the input point S is disposed in the triangular pyramid shown in FIG. 10C. When $R_l$ is smaller than $G_l$, the input point S is disposed in the triangular pyramid shown in FIG. 10B.

With the use of a comparison result between $R_l$ and $G_l$, the data items of lattice points to be read from the first table memory 12 can be reduced to three, namely, C11, C12, and C14, or C11, C13, and C14. Therefore, three reading operations are required in time-division data reading.

The select-signal generator 17 (shown in FIG. 5) determines the surface of a solid closest to the input point according to low-order bit values. Then, the generator 17 selects three apexes among the four apexes on the surface according to a comparison result between low-order bits in each color component, and generates and outputs a select signal indicating the type of the three apexes.

The first table memory 12 generates three address data items according to the select signal and the high-order bit signals, and outputs three lattice point data items.

The obtained three lattice point data items are called C11, C12, and C13. With these three values, output C21 (hereinafter called C2) from the second table memory 14, and the low-order bit signals $R_l$, $G_l$, and $B_l$, the final output signal C is determined by the following equations.

When $R_l > G_l$, $C=(C11\times(L-R_l-B_l)+C12\times(R_l-G_l)+C13\times(G_l-B_l)+2\times C2\times B_l)/L$ (10)

When $R_l < G_l$, $C=(C11\times(L-G_l-B_l)+C12\times(G_l-R_l)+C13\times(R_l-B_1)+2\times C2\times B_l)/L$ (11)

where $L=2^{Nl}$.

It is clear that the above-described embodiment can be implemented with software in the same way. Since interpolation with equations (10) and (11) is based on a small number of data points, high-speed processing is possible.

Address generation based on high-order bit data reduces the load in reading table memory by decreasing the maximum number of addresses, $2^n$, required for maintaining interpolation precision to as low as "n", and suppresses reduction in interpolation precision due to a decrease in the number of addresses by preparing another table memory which stores an output value corresponding to high-order bit data plus the specified offset and by executing interpolation with the use of n+1 data items including the output from the memory.

The present invention is not limited to the above-described embodiment. Within the scope of the claims, the present invention can be applied to various cases.

What is claimed is:

1. A color-image processing apparatus for receiving n (n: natural number) types of color signals representing an input point and outputting a color signal based on said n types of color signals, comprising:

separating means for separating each of said n types of color signals into high-order bit data and low-order bit data;

selecting means for determining four combinations of high-order bit data according to a first comparison between the separated low-order bit data, and for selecting three combinations of high-order bit data from the four combinations of high-order bit data according to a second comparison between the separated low-order bit data;

first memory means for storing output values corresponding to a plurality of combinations of high-order bit data of said n types of color signals, and for outputting three output values corresponding to the selected three combinations of high-order bit data;

second memory means for storing output values corresponding to data combinations obtained by adding a specified offset to the plurality of combinations of high-order bit data of said n types of color signals, and for outputting an output value corresponding to the separated high-order bit data; and operation means for executing interpolation according to the three output values output by said first memory means, the output value output by said second memory means and the separated low-order bit data, and for outputting a color signal.

2. A color-image processing apparatus according to claim 1, wherein said specified offset is equal to half a minimum interval between the plurality of combinations of high-order bit data.

3. A color-image processing apparatus according to claim 1, wherein the three combinations of high-order bit data output by said first memory means are determined by a relationship in magnitude between the low-order bit data separated by said separating means.

4. A color-image processing apparatus according to claim 1, wherein said selecting means determines a surface of a cube closest to the input point according to the separated low-order bit data, selects three apexes from four apexes on the selected surface according to a relationship in magnitude of the separated low-order bits, and selects the three combinations of high-order bit data according to said three apexes.

5. A color-image processing apparatus according to claim 1, further comprising color-image forming means for forming a color image according to said other color signals.

6. A color-image processing method for receiving n (n: natural number) types of color signals representing an input point and outputting a color signal based on said n types of color signals, comprising:

a separating step for separating each of said n types of color signals into high-order bit and low-order bit data;

a selecting step for determining four combinations of high-order bit data according to a first comparison between the separated low-order bit data, and for selecting three combinations of high-order bit data from the four combinations of high-order bit data according to a second comparison between the separated low-order bit data;

a first reading step for reading from a first memory three output values corresponding to the three selected combinations of high-order bit data;

a second reading step for reading from a second memory one output value corresponding to the separated high-order bit data; and an operation step for executing interpolation according to the three output values read in said first reading step, the output value read in said second reading step and the separated low-order bit data, and for outputting a color signal, wherein the first memory stores output values corresponding to a plurality of combinations of high-order bit data of said n types of color signals, and the second memory stores output values corresponding to data combinations obtained by adding a specified offset to the plurality of combinations of high-order bit data of said n types of color signals.

7. A computer-readable memory medium storing computer-executable process steps to receive n (n: natural number) types of color signals representing an input point and to output a color signal based on said n types of color signals, the steps comprising:

a separating step to separate each of said n types of color signals into high-order bit and low-order bit data;

a selecting step to determine four combinations of high-order bit data according to a first comparison between the separated low-order bit data, and to select three combinations of high-order bit data from the four combinations of high-order bit data according to a second comparison between the separated low-order bit data;

a first reading step to read from a first memory three output values corresponding to the three selected combinations of high-order bit data;

a second reading step to read from a second memory one output value corresponding to the separated high-order bit data; and an operation step to execute interpolation according to the three output values read in said first reading step, the output value read in said second reading step and the separated low-order bit data, and to output a color signal, wherein the first memory stores output values corresponding to a plurality of combinations of high-order bit data of said n types of color signals, and the second memory stores output values corresponding to data combinations obtained by adding a specified offset to the plurality of combinations of high-order bit data of said n types of color signals.

* * * * *